Patented July 12, 1949

2,476,037

UNITED STATES PATENT OFFICE 2,476,037

WAX-SUBSTITUTED DIARYL DITHIOPHOSPHORIC ACIDS AND SALTS THEREOF

John J. Giammaria, Woodbury, N. J., assignor to Socony-Vacuum Oil Company, Incorporated, a corporation of New York No Drawing. Application April 5, 1945, Serial No. 586,835

13 Claims. (Cl. 260—429)

This invention has to do with new chemical compounds or reaction products which may be generally designated as wax-substituted diaryl dithiophosphoric acids and salts thereof.

The present invention is predicated upon the discovery that the compounds or reaction products contemplated herein when blended with a viscous mineral oil fraction such as hydrocarbon lubricating oil, will improve various properties of the oil. For example, these compounds or reaction products will inhibit oxidation of the oil, thereby retarding the formation of sludge and acidic products. They also retard changes in viscosity, in the oil, with temperature change during use. In addition, they are characterized by the ability to depress the pour point of oils.

It is to be understood, however, that the present invention is not concerned with mineral oil compositions, such compositions forming the subject matter of my copending application, Serial No. 528,783, filed March 30, 1944, now matured into U. S. Patent No. 2,410,650, issued November 5, 1946, of which the present application is a continuation-in-part, the latter application, in turn, being a continuation-in-part of application Serial No. 390,586, filed April 26, 1941, now abandoned.

It is also to be understood that the use of the compounds or reaction products contemplated herein is not confined to the improvement of mineral oils. For example, they may be used as cutting oils, rubber accelerators, extreme pressure lubricants and as intermediates in the production of other chemical compositions. Numerous other uses and applications of these compounds or reaction products will be readily apparent to those skilled in the art from the description of their composition and typical methods for preparing them, as provided hereinafter.

The class of compounds or reaction products contemplated herein are organic compounds containing sulfur, phosphorus and metal in chemical combination or a mixture thereof predominantly comprised of compounds obtained by reacting phosphorus penta-sulfide with an alkyl-substituted phenol and then introducing metal into the product thus obtained by reaction with a metal hydroxide or the like. These compounds or reaction products contain a hydrocarbon group or groups of a character which will impart oil-miscibility or oil-solubility to the compound or reaction product.

The present invention contemplates compounds of the class described wherein the oil-solubilizing action is obtained from an alkylated aryl nucleus which, in addition to oil-solubility imparts pour-depressant properties to the compound or reaction product. The pour-depressant property is obtained by employing an aryl nucleus which is substituted with relatively long-chain alkyl groups, such as those characterizing paraffin wax (predominantly alkyl groups of at least twenty carbon atoms).

A compound or reaction product of the type contemplated herein may be broadly described as an oil-miscible metal salt of a thio acid of phosphorus or, more specifically, as a metal salt of a partial ester of a thio acid of phosphorus, obtained by reacting $P_2S_5$ with a compound having the general formula ROH wherein R represents an alkaryl oil solubilizing hydrocarbon group of the type described above and then reacting the product thus obtained with a reactive metal compound. Although, as aforesaid, we do not wish to be bound by any theory of reaction or formula of the product, it does appear that under certain conditions of reaction and reactants the ultimate products obtained are the metal salts of wax-substituted diaryl dithiophosphoric acid, the general structural formula of which may be expressed as follows:

I.

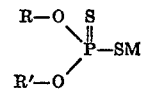

wherein R and R' represent alkaryl hydrocarbon groups in which the alkyl substituents correspond to high molecular weight aliphatic hydrocarbon materials, such as paraffin wax and are predominantly groups of at least twenty carbon atoms; and M represents the hydrogen equivalent of a metal.

These materials which, as aforesaid, possess pour depressing properties in addition to other oil characterizing properties may, for purposes of illustration, be typified by the metal salt of a wax-substituted diphenyl dithiophosphoric acid and may be represented by the following general formula

II.

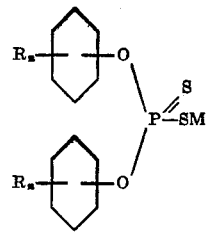

wherein $R_n$ represents at least one alkyl group having at least twenty carbon atoms or an alkyl group corresponding to the aliphatic hydrocarbons characterizing paraffin wax, and M is as defined above. As aforesaid, however, the formulae and nomenclature used herein are based upon our theory of the reaction and are intended to represent the reaction product obtained rather than a specific chemical compound in each instance.

It is to be understood that the aryl nucleus in compounds of the type represented by the foregoing general Formulae I and II may be mono- or poly-cyclic and, as aforesaid, the alkyl substituent thereon should correspond to an alkyl group of sufficiently high molecular weight to impart to the compound pour point-depressing and viscosity index-improving action in addition to oil miscibility. For alkyl substituents that will impart these properties, particular preference is given to alkyl groups of at least twenty carbon atoms.

As to the metallic constituent M, it appears that any metal may be used. The alkaline earth metals are preferred, with particular preference given to barium. Other representative metals which may be used are zinc, tin, aluminum, cobalt, nickel, chromium, the alkali metals, etc.

As aforesaid, the reaction products contemplated herein as typified by the metal salts of the partial esters of dithiophosphoric acid may be prepared by first forming the corresponding partial ester of dithiophosphoric acid by any known method, such as that described by P. S. Peschimuka (J. Russ. Phys. Chem. Soc., 56, 11 (1925); (Chem. Ab., 19, 2808), wherein phosphorus pentasulfide is reacted with an alcohol, and then reacting the partially esterified acid thus formed with a metallic hydroxide to form the metal salt of the partial ester of dithiophosphoric acid. The reactions involved can probably be expressed by the following equations, although, as aforesaid, we do not wish to be bound by any theory of reaction.

(A)     $4ROH + P_2S_5 \rightarrow 2(RO)_2PSSH + H_2S$
(B)     $(RO)_2PSSH + MOH \rightarrow (RO)_2PSSM + H_2O$ As a modification of the foregoing procedure reaction (B) may be carried out with sodium or potassium hydroxide (M'OH) to form the corresponding salt $(RO)_2PSSM'$, which can then be reacted with a water-soluble salt of another metal, such as zinc chloride or stannous chloride, to yield by metathesis, the substituted dithiophosphoric acid salt of the second metal.

Further details in the procedure which may be followed in synthesizing the compounds contemplated herein, may be obtained from the following illustrative examples.

EXAMPLE 1

METAL SALTS OF DI-ALKARYL DITHIOPHOSPHORIC ACID

Wax-substituted phenol was first prepared by the Friedel-Crafts condensation of chlorinated paraffin wax (16 per cent chlorine content) with phenol in the ratio of 1 molecular part phenol to 3 atomic parts chlorine in the chlorwax. The wax-substituted diphenyl dithiophosphoric acid was obtained by making a reaction mixture of 100 grams of the wax-phenol, 8.1 grams of $P_2S_5$, and 300 grams of mineral oil of Saybolt viscosity of 67 seconds at 210° F. This mixture was heated at 100° C. until the evolution of $H_2S$ had substantially stopped (about 15 or 20 hours). The clear solution was then blown with a stream of nitrogen to remove entrained $H_2S$, to obtain the product which, for purposes of identification herein we may refer to as wax-substituted diphenyl dithiophosphoric acid (3–16) in approximately 25 per cent mineral oil blend.

The stannous salt of "wax-substituted diphenyl dithiophosphoric acid" was obtained by dissolving 100 grams of the acid product obtained by the procedure last described above (dissolved in 300 grams of mineral oil) in 100 cc. of butyl alcohol, adding 1.5 grams of metallic sodium, and heating the mixture at the reflux temperature of the alcohol until the sodium was all reacted. A butyl alcohol solution of stannous chloride (6.2 grams of $SnCl_2$) was then added and the mixture slowly heated to 150° C. while the alcohol was distilled off. The mixture was then cooled, diluted with benzol and filtered through a filter-aid clay to remove NaCl, after which the solvent was distilled off to obtain the finished product.

The barium salt of "wax-substituted diphenyl dithiophosphoric acid" was prepared by forming a reaction mixture consisting of 100 grams of the "wax-substituted diphenyl dithiophosphoric acid" in 300 grams of mineral oil, 11 grams of

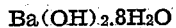

$$Ba(OH)_2 \cdot 8H_2O$$

and 100 cc. of benzol. The mixture was gradually heated to 150° C., the benzol and the water formed in the reaction thereby being distilled off. After the reaction mixture was cooled, it was diluted with benzol, filtered through a filter-aid clay to remove unreacted $Ba(OH)_2 \cdot 8H_2O$, and the solvent was distilled off to obtain the finished product.

Typical metal salts of partial esters of dithiophosphoric acid which have been synthesized and demonstrated to be effective addition agents for hydrocarbon oils of the type used in lubricants and the like are the following:

Stannous di(wax-phenyl) dithiophosphate
Barium di(wax-phenyl) dithiophosphate

The following examples will illustrate the effectiveness of the compounds contemplated herein to stabilize and improve the various properties of various viscous hydrocarbon oils.

EXAMPLE 2

CORROSION TEST

The corrosion-inhibiting action of these compounds was demonstrated in the so-called catalyzed Underwood oxidation test, which is described in a pamphlet, dated August 1, 1938, of the Research Laboratories Division of the General Motors Corporation, entitled "Underwood Oxidation Testing Apparatus." The following results were obtained by using a motor oil of 210 seconds Saybolt viscosity at 130° F. with the addition of sufficient iron naphthenate to be equivalent to 0.01 per cent iron oxide to act as a catalyst. Bearings containing a cadmium-nickel surface were used and the Mg. loss in bearing weight and the acidity of the oil (N. N. value) were determined after five hours of test.

*Table I*

| Compound Added | Per Cent | Mgm. Loss in Bearing | N. N. |
|---|---|---|---|
| None | | 789 | 13.4 |
| Ba salt of wax-substituted diphenyl dithiophosphoric acid (3–16) | 1 | 40 | 2.1 |

EXAMPLE 3

POUR DEPRESSANT AND V. I. IMPROVEMENT

As aforesaid, the so-called "wax"-substituted compounds have the properties of acting as pour point-depressants and viscosity index-improvers.

These properties are demonstrated by the results set forth in Tables II and III below showing pour point-depressing and V. I. results, respectively, on typical motor oils with and without the addition agent.

*Table II*

| Compound Blended with Motor Oil of 67 Sec. Saybolt Viscosity at 210° F. | A. S. T. M. Pour Points on Oil Blends | | |
| --- | --- | --- | --- |
|  | 0% | 1/16% | 1/8% |
|  | °F. | °F. | °F. |
| None | +20 |  |  |
| Barium salt of wax-substituted diphenyl dithiophosphoric acid (3-16) |  | −10 | −20 |

*Table III*

| Compound Blended with Lubricating Oil | Conc. | Kinematic Viscosity | | V. I. |
| --- | --- | --- | --- | --- |
|  |  | 100° F. | 210° F. |  |
|  | Per cent |  |  |  |
| None | 0 | 29.56 | 4.72 | 76.7 |
| Wax-substituted diphenyl dithiophosphoric acid (3-16) | 1 | 32.28 | 5.04 | 86.0 |
| Barium salt of wax-substituted diphenyl dithio phosphoric acid (3-16) | 1 | 33.06 | 5.15 | 89.6 |

The parenthetical expression "(3-16)" used in Tables I, II and III and in Example 1 above indicates the number of atomic proportions (3) of chlorine in the chlorwax reacted with 1 molecular part of phenol and the percentage (16) of chlorine in the chlorwax used in this reaction from which the wax phenol was obtained. This wax phenol (3-16) provides the wax-substituted phenyl substituents in the salts disclosed herein, as described in Example 1.

The compounds or reaction products contemplated herein may be used in various amounts depending upon the character of the oil and the severity of the conditions under which it is to be used. In general it appears that satisfactory improvement may be obtained with amounts ranging from about 0.01 per cent to about 5.0 per cent.

It is to be understood that while I have herein described certain specific compounds and procedures to illustrate the invention, such specific examples are illustrative only and the invention embraces within its scope such changes and modifications as fairly come within the spirit of the appended claims.

I claim:

1. Compounds having the general formula

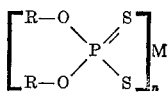

in which R is a paraffin wax-substituted aryl radical, said paraffin wax substituent containing at least 20 carbon atoms, M is a member of the group consisting of hydrogen and basic salt-forming groups, and $n$ is the valence of hydrogen or the basic salt-forming group.

2. Compounds having the general formula

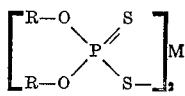

in which R is a paraffin wax-substituted aryl radical, said paraffin wax substituent containing at least 20 carbon atoms, and M is an alkaline earth metal.

3. Compounds having the general formula

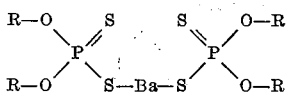

in which R is a paraffin wax-substituted aryl radical, said paraffin wax substituent containing at least 20 carbon atoms.

4. Compounds having the general formula

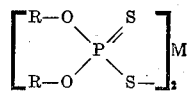

in which R is a paraffin wax substituted phenyl radical, said paraffin wax substituent containing at least 20 carbon atoms, and M is an alkaline earth metal.

5. Compounds having the general formula

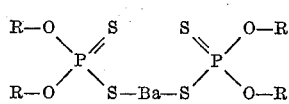

in which R is a paraffin wax-substituted-phenyl radical said wax substituent containing at least 20 carbon atoms.

6. As a new composition of matter, an oil-miscible metal salt of a substituted thio acid of phosphorus having the general formula

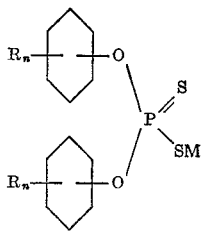

wherein $R_n$ represents at least 1 paraffin wax group containing at least 20 carbon atoms, and M represents the hydrogen equivalent of a metal.

7. As a new composition of matter, an oil-miscible metal salt of a paraffin wax-phenyl-substituted thio acid of phosphorus, said paraffin wax substituent containing at least 20 carbon atoms.

8. As a new composition of matter, a metal salt of a paraffin wax-substituted diaryl dithiophosphoric acid, said paraffin-wax substituent containing at least 20 carbon atoms.

9. As a new composition of matter, an alkaline earth metal salt of a paraffin wax-substituted diaryl dithiophosphoric acid, said paraffin wax substituent containing at least 20 carbon atoms.

10. As a new composition of matter, the barium salt of di (paraffin wax phenyl) dithiophosphoric acid, said paraffin wax substituent containing at least 20 carbon atoms.

11. As a new composition of matter, an oil-miscible zinc salt of an acidic reaction product obtained by reacting $P_2S_5$ with a compound having the formula

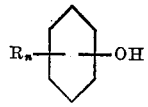

wherein $R_n$ represents at least 1 paraffin wax group containing at least 20 carbon atoms.

12. As a new composition of matter, an oil-miscible stannous salt of an acidic reaction product obtained by reacting $P_2S_5$ with a compound having the formula

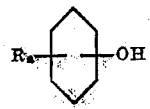

wherein $R_n$ represents at least 1 paraffin wax group containing at least 20 carbon atoms.

13. Compounds having the general formula

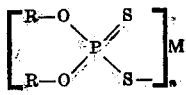

in which R is a paraffin wax substituted phenyl radical, said paraffin wax substituent containing at least 20 carbon atoms; M is a member of the group consisting of hydrogen and basic salt-forming groups, and $n$ is the valence of hydrogen or the basic salt-forming group.

JOHN J. GIAMMARIA.

REFERENCES CITED

The following references are of record in the file of this patent:

UNITED STATES PATENTS

| Number | Name | Date |
|---|---|---|
| 1,867,631 | Romieux | July 19, 1932 |
| 1,893,018 | Christman | Jan. 3, 1933 |
| 1,939,951 | Buchanan | Dec. 19, 1933 |
| 2,177,923 | Berger | Oct. 31, 1939 |
| 2,188,943 | Evers | Feb. 6, 1940 |
| 2,205,337 | Berger | June 18, 1940 |
| 2,206,284 | Jayne | July 2, 1940 |
| 2,246,059 | Moran | June 17, 1941 |
| 2,252,984 | Rutherford | Aug. 19, 1941 |
| 2,252,985 | Rutherford | Aug. 19, 1941 |
| 2,365,938 | Cook | Dec. 26, 1944 |